July 5, 1955 P. A. GROBEY 2,712,449
CHUCK FOR HOLDING EXTERNALLY TAPERED WORK
Filed Feb. 4, 1952 2 Sheets-Sheet 1

Inventor
Paul A. Grobey
by Wright, Brown,
Quinby & May Attys.

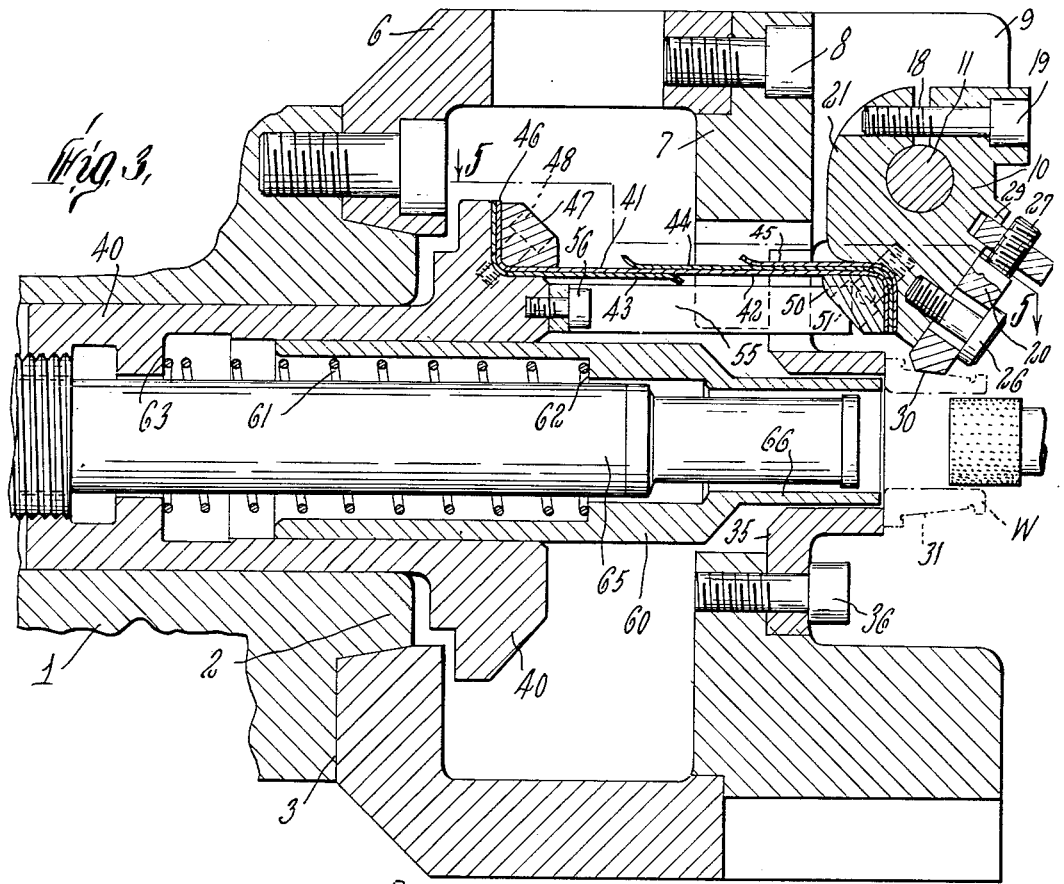

2,712,449

CHUCK FOR HOLDING EXTERNALLY TAPERED WORK

Paul A. Grobey, Springfield, Vt., assignor to Bryant Chucking Grinder Company, Springfield, Vt., a corporation of Vermont Application February 4, 1952, Serial No. 269,856

6 Claims. (Cl. 279—106)

This invention relates to chucks for holding externally tapered work, leaving a central bore free for machining operations, such, for example, as grinding, and it has for an object to insure maximum accuracy of the work piece between the outside tapered surface, the inner bore, and the back end face.

A further object is to provide work clamping jaws with tips adjustable to properly engage work pieces of different contours and removable to provide for attachment of other tips having differently arranged work-engaging faces.

Still another object is to provide high accuracy of contact on the work of the work-clamping jaws.

A further object is to provide a construction in which dirt is effectively kept away from parts where its presence could impair accuracy.

A further object is to provide a construction wherein the centering action on a work piece acts also to pull the work piece against a backing surface.

Further objects and advantages will appear from a description of an embodiment of this invention shown in the accompanying drawings in which Figure 1 is a front end elevation of a chuck embodying the invention.

Figures 2 and 3 are detail sectional views on lines 2—2 and 3—3, respectively, of Figure 1.

Figure 4 is a view similar to a portion of Figure 3, but showing the chuck open.

Figure 5 is a section on line 5—5 of Figure 3.

Figure 1:
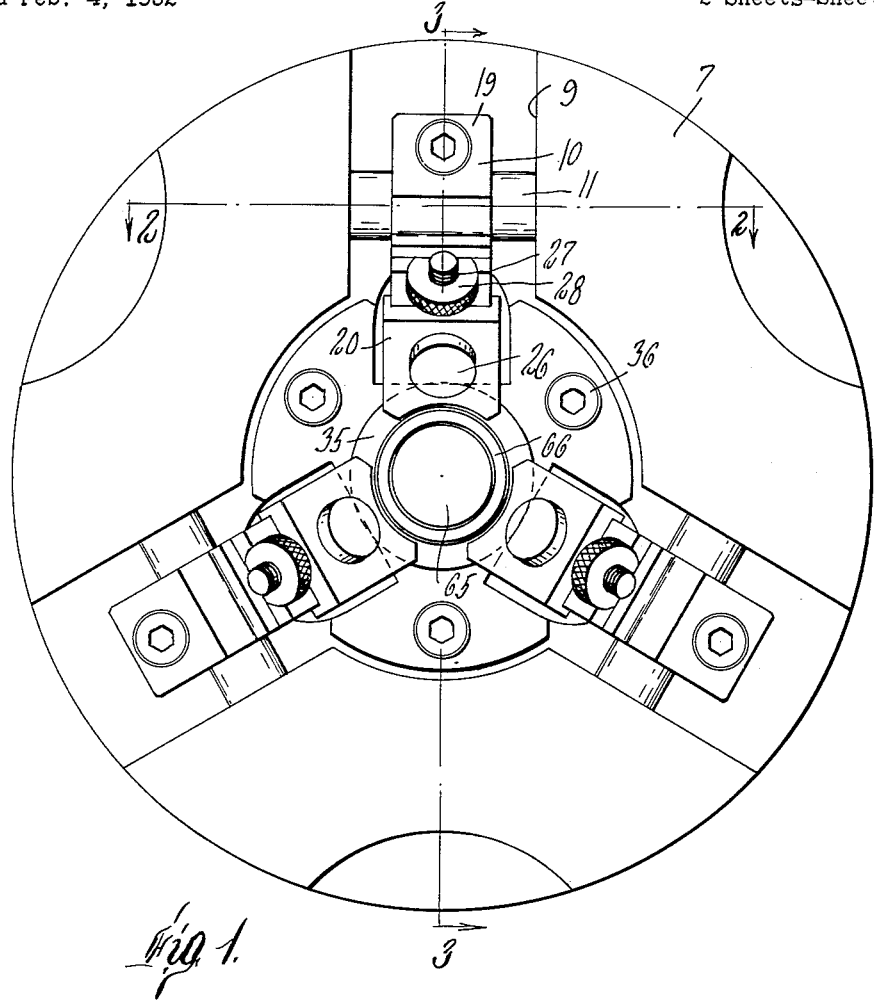

Referring to the drawings, at 1 in Figure 3, is illustrated the forward end of a rotary spindle provided with a nose to which the chuck of this invention may be secured. This nose is shown as a standard spindle nose having an externally tapered annular portion 2 extending outwardly from a flat end face 3. The chuck comprises a body formed of a rear annular section 6 and a forward annular section 7 which may be secured together at suitable intervals as by screws 8.

Figure 2:
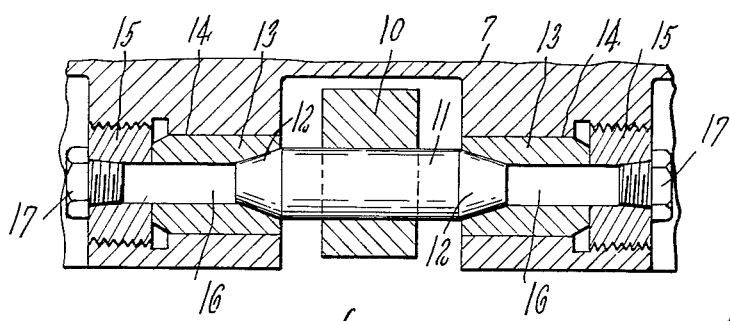

The outer body member 7 is provided with slots 9, three being shown and arranged 120° apart, within each of which is pivotally mounted a jaw member 10. The particular mounting for each jaw member is shown in Figure 2, wherein the pivot 11 is provided with conical ends 12 journaled in complementally shaped sleeves 13 mounted in sockets 14 in the body portion 7. The outer ends of these sockets are shown as closed off by threaded plugs 15 having lubrication openings therethrough leading into bores 16 of the sleeves 13 and normally closed by means such as threaded plugs 17. The jaws 10 are shown in Figure 3 as being slit, the slit portions being adjustable to be closed with the desired clamping pressure against the pivots 11, as by screws 18 threaded into one of these parts and having its head 19 engaging in a recess in the other part.

The jaws are provided with work-engaging elements 20 which may be adjustably secured to flat faces 21 of the jaws. As shown, each element is provided with a slot 24 through which passes a screw 26 threaded into the jaw member 10 and each of these elements 20 is also provided with a threaded shank 27 on which is engaged a nut 28 having a knurled periphery and which engages in a slot 29 in the jaw 10. By loosening the screw 26 and turning the corresponding nut 28, it is evident that the element 20 may be adjusted lengthwise of its shank 27 to bring its inner end 30 toward and from the axis of the body. As shown this end 30 is arranged with two angularly related faces, the longer of which may engage against the axially tapered face 31 of a work piece W. The jaws when in work-clamping position lie substantially in a plane transverse to the spindle axis, the pivots 11 and the engagement between the elements 20 and the work piece lying substantially in a common plane. With this arrangement pressure between the work piece and the elements 20 has substantially no effect tending to swing the elements 20 on the pivots toward work-releasing angular positions, the three elements 10 then acting together like a straightened toggle to clamp the work piece. This work piece may thus be clamped between the elements 20 but may be adjusted to present the work piece accurately coaxial, as measured from its outer tapered face, with the chuck and the spindle, and by employing elements 20 with differently contoured work-engaging faces, work pieces of various external contours may be accurately engaged thereby. These work pieces may be engaged by the jaws and pressed rearwardly against a backing member 35 which as shown may be of annular form and secured to the forward face of the body member 7, as by screws 36.

In order to move the jaw members between work clamping and unclamping positions, they are connected to an axially movable sleeve 40 which is slidable through the spindle 1. For insuring simultaneous closing movement of the jaws, they are connected to the sleeve 40 by flexible elements comprising leaf springs 41 extending through slots 39 through the member 7. Each leaf spring, as shown, comprises an intermediate continuous leaf 42 which is backed up toward its rear end by a leaf 43 and at its forward end by leaves 44 and 45. The leaves 43, with intermediate leaf 42, are secured to the outer end of the sleeve 40, being bent outwardly at substantially right angles as at 46 and secured to mating faces at the outer end of the sleeve 40 as by a V shaped plug 47 secured as by a screw 48 which passes through the leaves 41 and 43 and into the sleeve 40. The forward end of each leaf 43 terminates between the adjacent faces of the body portions 6 and 7. The leaves 44 and 45 extend with the leaf 42 and their inner ends are bent substantially at right angles inwardly toward the axis of the chuck and there secured to the corresponding jaws 10 as by the block 50 and a screw 51. These springs allow flexing as the jaws are turned about their pivots while they are being moved outwardly as the sleeve 40 is moved forwardly from the position shown in Figure 3 to that shown in Figure 4, and this releasing movement of the jaws is further facilitated by the action of presser elements 55 formed U shaped and with their rear ends at the U secured to the forward or outer end of the sleeve 40 as by the screws 56. The outer or forward ends of the elements 55 may engage rearwardly of pins 57 projecting outwardly from the sides of the blocks 50 as shown in Figure 5, so as the sleeve 40 is moved forwardly, the elements 55 engage these pins and forcibly rock the jaws to the releasing position shown in Figure 4. The leaf springs are effective to pull the jaws without any lost motion into clamping position on reverse direction of motion of the sleeve 40.

A work ejector sleeve 60 may be axially slidable within the sleeve 40 and may be normally pressed toward ejecting position as by a coil spring 61 bearing at one end against an annular shoulder 62 of the ejector sleeve 60, and at the other against an annular shoulder 63 of the sleeve 40 and further inwardly of the ejector sleeve 60 there may be positioned a plug gage 65. The outer end of the ejector sleeve 60 may be provided with a reduced diameter portion 66 which may engage the rear face of the work piece inwardly of the backing member 35 and when the sleeve 40 is moved to open the jaws, the ejector is also moved toward the work by the spring 61 to eject the work as soon as the jaw 10 frees it.

From the foregoing description of an embodiment of this invention it should be evident to those skilled in the art that various changes and modifications may be made therein without departing from its spirit or scope.

I claim:

1. A chuck comprising a body for attachment to a rotary spindle, a backing member carried by said body and having a face against which a work piece carried by said chuck may engage, a plurality of jaws pivoted to said body and movable to clamp a work piece against said face, a jaw-actuating member movable axially of said spindle and body and having elements extending through said backing member for engagement with said jaws and for moving said jaws out of clamping positions by motion of said actuating member in one direction, and leaf springs connecting said actuating member and jaws for causing the motion of said actuating member in the opposite direction to swing said jaws toward clamping positions.

2. A chuck comprising a body for attachment to a rotary spindle, a backing member carried by said body and having a face against which a work piece carried by said chuck may engage, a plurality of jaws pivoted to said body and movable to clamp a work piece against said face, work-engaging elements adjustably secured to said jaws each having a face for substantially mating contact with an axially tapered external surface of a work piece positioned within said jaws, and means for swinging said jaws between work-clamping and releasing positions the pivots of said jaws when said jaws are in work-clamping positions lying substantially in a plane with the engagement of said elements on the work.

3. A chuck comprising a body for attachment to a rotary spindle, a backing member carried by said body and having a face against which a work piece carried by said chuck may engage, a plurality of jaws pivoted to said body and movable to clamp a work piece against said face, work-engaging elements adjustably secured to said jaws each having a face for substantially mating contact with an axially tapered external surface of a work piece positioned within said jaws and a threaded rear extremity, a nut threaded on each extremity and engaging in a slot in its jaw, said elements and jaws having screw and slot connections whereby turning of said nuts adjusts said face from and toward the axis of said body, and means for swinging said jaws between work-clamping and releasing positions the pivots of said jaws when said jaws are in work-clamping positions lying substantially in a plane with the engagement of said elements on the work.

4. A chuck comprising a body for attachment to a rotary spindle, a backing member having a face against which a work piece carried by said chuck may engage, a plurality of jaws pivoted to said body and movable to clamp a work piece against said face, a jaw-actuating member movable axially of said spindle and body, and leaf springs connecting said actuating member and jaws.

5. A chuck comprising a body for attachment to a rotary spindle, a plurality of jaws pivoted to said body and movable to clamp a work piece, a jaw-actuating member movable axially of said spindle and having rigid parts adapted to impinge on the inner faces of said jaws and swing said jaws about their pivots to work piece releasing conditions on motion of said member in one direction, and flexible connections between said member and jaws adapted to pull said jaws into work-clamping positions on motion of said member in the opposite direction.

6. A chuck comprising a body for attachment to a rotary spindle, a plurality of jaws pivoted to said body and movable to clamp a work piece, a jaw-actuating member movable axially of said spindle and having rigid parts adapted to impinge on the inner faces of said jaws and swing said jaws about their pivots to work piece releasing conditions on motion of said member in one direction, and flexible connections between said member and jaws adapted to pull said jaws into work-clamping positions on motion of said member in the opposite direction, said jaws when in clamping positions lying substantially in a common plane.

References Cited in the file of this patent

UNITED STATES PATENTS

| 1,135,057 | Schultis | Apr. 13, 1915 |
| 1,519,337 | Schlaupitz | Dec. 16, 1924 |
| 1,770,148 | Stevens | July 8, 1930 |

FOREIGN PATENTS

| 129,310 | Germany | Mar. 2, 1901 |